(12) United States Patent
Matta

(10) Patent No.: US 8,064,939 B2
(45) Date of Patent: *Nov. 22, 2011

(54) WIRELESS LOAD BALANCING

(75) Inventor: Sudheer Poorna Chandra Matta, Tracy, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 12/491,201

(22) Filed: Jun. 24, 2009

(65) Prior Publication Data

US 2009/0323531 A1 Dec. 31, 2009

Related U.S. Application Data

(63) Continuation of application No. 11/445,750, filed on Jun. 1, 2006, now Pat. No. 7,577,453.

(51) Int. Cl.
*H04Q 7/20* (2006.01)

(52) U.S. Cl. ..... 455/509; 455/450; 455/453; 455/552.1; 455/550.1; 455/434; 370/310; 370/328; 370/329; 370/343

(58) Field of Classification Search ............... 455/509, 455/500, 501, 450, 453, 550.1, 552.1, 422.1, 455/403, 426.1, 426.2, 434, 515; 370/310, 370/328, 329, 343
See application file for complete search history.

(56) References Cited

U.S. PATENT DOCUMENTS

| | | | |
|---|---|---|---|
| 5,339,316 A | 8/1994 | Diepstraten | |
| 5,371,783 A | 12/1994 | Rose et al. | |
| 5,488,569 A | 1/1996 | Kaplan et al. | |
| 5,774,460 A | 6/1998 | Schiffel et al. | |
| 5,887,259 A | 3/1999 | Zicker et al. | |
| 6,041,240 A | 3/2000 | McCarthy et al. | |
| 6,101,539 A | 8/2000 | Kennelly et al. | |
| 6,118,771 A | 9/2000 | Tajika et al. | |
| 6,262,988 B1 | 7/2001 | Vig | |
| 6,304,596 B1 | 10/2001 | Yamano et al. | |
| 6,614,787 B1 | 9/2003 | Jain et al. | |
| 6,624,762 B1 | 9/2003 | End, III | |

(Continued)

FOREIGN PATENT DOCUMENTS

WO WO-9403986 2/1994

(Continued)

OTHER PUBLICATIONS

Puttini, R., Percher, J., Me, L., and De Sousa, R. 2004. A Fully distributed IDS for Manet. In *Proceedings of the Ninth international Symposium on Computers and Communications 2004 vol. 2 (Iscc"04)—vol. 02* (Jun. 28-Jul. 1, 2004). ISCC. IEEE Computer Society. Washington. DC. 331-338.

(Continued)

*Primary Examiner* — Keith Ferguson
(74) *Attorney, Agent, or Firm* — Harrity & Harrity, LLP

(57) ABSTRACT

A technique for wireless load balancing involves providing a wireless infrastructure that creates a target band option and helps push clients toward that band. An example of a method according to the technique involves, by way of example but not limitation, responding only to probe requests on a first band when a client is detected on the first band and a second band. For example, using the techniques described herein, a platform that is both 802.11a and 802.11b/g compliant may attempt to connect preferentially to the 802.11b/g band of a wireless network, and be migrated toward the 802.11a band instead.

15 Claims, 7 Drawing Sheets

U.S. PATENT DOCUMENTS

| | | | |
|---|---|---|---|
| 6,697,415 B1 | 2/2004 | Mahany | |
| 6,760,324 B1 | 7/2004 | Scott et al. | |
| 6,839,348 B2 | 1/2005 | Tang et al. | |
| 6,879,812 B2 | 4/2005 | Agrawal et al. | |
| 6,957,067 B1 | 10/2005 | Iyer et al. | |
| 7,020,438 B2 | 3/2006 | Sinivaara et al. | |
| 7,024,394 B1 | 4/2006 | Ashour et al. | |
| 7,062,566 B2 | 6/2006 | Amara et al. | |
| 7,068,999 B2 | 6/2006 | Ballai | |
| 7,116,979 B2 | 10/2006 | Backes et al. | |
| 7,139,579 B2 * | 11/2006 | Hatano | 455/453 |
| 7,146,166 B2 | 12/2006 | Backes et al. | |
| 7,155,518 B2 | 12/2006 | Forslow | |
| 7,221,927 B2 | 5/2007 | Kolar et al. | |
| 7,224,970 B2 | 5/2007 | Smith et al. | |
| 7,263,366 B2 | 8/2007 | Miyashita | |
| 7,280,495 B1 | 10/2007 | Zweig et al. | |
| 7,317,914 B2 | 1/2008 | Adya et al. | |
| 7,324,468 B2 | 1/2008 | Fischer | |
| 7,324,487 B2 | 1/2008 | Saito | |
| 7,359,676 B2 | 4/2008 | Hrastar | |
| 7,370,362 B2 | 5/2008 | Olson et al. | |
| 7,376,080 B1 | 5/2008 | Riddle et al. | |
| 7,406,069 B2 * | 7/2008 | Yashar et al. | 370/338 |
| 7,421,248 B1 | 9/2008 | Laux et al. | |
| 7,466,678 B2 | 12/2008 | Cromer et al. | |
| 7,489,648 B2 | 2/2009 | Griswold | |
| 7,509,096 B2 | 3/2009 | Palm et al. | |
| 7,529,925 B2 | 5/2009 | Harkins | |
| 7,551,619 B2 | 6/2009 | Tiwari | |
| 7,573,859 B2 | 8/2009 | Taylor | |
| 7,577,453 B2 | 8/2009 | Matta | |
| 2001/0024953 A1 | 9/2001 | Balogh | |
| 2002/0060995 A1 | 5/2002 | Cervello et al. | |
| 2002/0176437 A1 | 11/2002 | Busch et al. | |
| 2003/0055959 A1 | 3/2003 | Sato | |
| 2003/0134642 A1 | 7/2003 | Kostic et al. | |
| 2003/0135762 A1 | 7/2003 | Macaulay | |
| 2003/0227934 A1 | 12/2003 | White et al. | |
| 2004/0003285 A1 | 1/2004 | Whelan et al. | |
| 2004/0053632 A1 | 3/2004 | Nikkelen et al. | |
| 2004/0062267 A1 | 4/2004 | Minami et al. | |
| 2004/0068668 A1 | 4/2004 | Lor et al. | |
| 2004/0120370 A1 | 6/2004 | Lupo | |
| 2004/0165545 A1 | 8/2004 | Cook | |
| 2004/0208570 A1 | 10/2004 | Reader | |
| 2004/0221042 A1 | 11/2004 | Meier | |
| 2004/0236702 A1 | 11/2004 | Fink et al. | |
| 2004/0255167 A1 | 12/2004 | Knight | |
| 2005/0037818 A1 | 2/2005 | Seshadri et al. | |
| 2005/0054326 A1 | 3/2005 | Rogers | |
| 2005/0059405 A1 | 3/2005 | Thomson et al. | |
| 2005/0059406 A1 | 3/2005 | Thomson et al. | |
| 2005/0064873 A1 | 3/2005 | Karaoguz et al. | |
| 2005/0068925 A1 | 3/2005 | Palm et al. | |
| 2005/0097618 A1 | 5/2005 | Arling et al. | |
| 2005/0122977 A1 | 6/2005 | Lieberman | |
| 2005/0239461 A1 | 10/2005 | Verma et al. | |
| 2005/0240665 A1 | 10/2005 | Gu et al. | |
| 2005/0245269 A1 | 11/2005 | Demirhan et al. | |
| 2006/0073827 A1 * | 4/2006 | Vaisanen et al. | 455/436 |
| 2006/0104224 A1 | 5/2006 | Singh et al. | |
| 2006/0128415 A1 | 6/2006 | Horikoshi et al. | |
| 2006/0161983 A1 | 7/2006 | Cothrell et al. | |
| 2006/0174336 A1 | 8/2006 | Chen | |
| 2006/0189311 A1 | 8/2006 | Cromer et al. | |
| 2006/0227725 A1 * | 10/2006 | Huotari et al. | 370/254 |
| 2006/0245393 A1 | 11/2006 | Bajic | |
| 2006/0248331 A1 | 11/2006 | Harkins | |
| 2006/0276192 A1 | 12/2006 | Dutta et al. | |
| 2007/0025265 A1 | 2/2007 | Porras et al. | |
| 2007/0064718 A1 | 3/2007 | Ekl et al. | |
| 2007/0070937 A1 | 3/2007 | Demirhan et al. | |
| 2007/0083924 A1 | 4/2007 | Lu | |
| 2007/0086378 A1 | 4/2007 | Matta et al. | |
| 2007/0091889 A1 | 4/2007 | Xiao et al. | |
| 2007/0189222 A1 | 8/2007 | Kolar et al. | |
| 2007/0260720 A1 | 11/2007 | Morain | |
| 2008/0008117 A1 | 1/2008 | Alizadeh-Shabdiz | |
| 2008/0013481 A1 | 1/2008 | Simons et al. | |
| 2008/0056200 A1 | 3/2008 | Johnson | |
| 2008/0056211 A1 | 3/2008 | Kim et al. | |
| 2008/0096575 A1 | 4/2008 | Aragon et al. | |
| 2008/0107077 A1 | 5/2008 | Murphy | |
| 2008/0114784 A1 | 5/2008 | Murphy | |
| 2008/0117822 A1 | 5/2008 | Murphy et al. | |
| 2008/0151844 A1 | 6/2008 | Tiwari | |
| 2008/0162921 A1 | 7/2008 | Chesnutt et al. | |
| 2009/0031044 A1 | 1/2009 | Barrack et al. | |
| 2009/0198999 A1 | 8/2009 | Harkins | |

FOREIGN PATENT DOCUMENTS

| | | |
|---|---|---|
| WO | WO-9911003 | 3/1999 |
| WO | WO-03085544 | 10/2003 |
| WO | WO-2004095192 | 11/2004 |
| WO | WO-2004095800 | 11/2004 |

OTHER PUBLICATIONS

Co-pending U.S. Appl. No. 10/778,901, filed Feb. 13, 2004.
Co-pending U.S. Appl. No. 11/784,307, filed Apr. 5, 2007.
Co-pending U.S. Appl. No. 11/377,859, filed Mar. 15, 2006.
Co-pending U.S. Appl. No. 12/401,473, filed Mar. 10, 2009.
Co-pending U.S. Appl. No. 11/326,966, filed Jan. 5, 2006.
Co-pending U.S. Appl. No. 12/500,392, filed Jul. 9, 2009.
Co-pending U.S. Appl. No. 11/330,877, filed Jan. 11, 2006.
Co-pending U.S. Appl. No. 11/351,104, filed Feb. 8, 2006.
Co-pending U.S. Appl. No. 11/331,789, filed Jan. 14, 2006.
Co-pending U.S. Appl. No. 11/445,750, filed Jun. 1, 2006.
Co-pending U.S. Appl. No. 11/417,830, filed May 3, 2006.
Co-pending U.S. Appl. No. 11/400,165, filed Apr. 5, 2006.
Co-pending U.S. Appl. No. 11/592,891, filed Nov. 3, 2006.
Co-pending U.S. Appl. No. 12/603,391, filed Oct. 21, 2009.
Co-pending U.S. Appl. No. 11/595,119, filed Nov. 10, 2006.
Co-pending U.S. Appl. No. 11/604,075, filed Nov. 22, 2006.
Co-pending U.S. Appl. No. 11/487,722, filed Jul. 17, 2006.
Co-pending U.S. Appl. No. 11/643,329, filed Dec. 20, 2006.
Co-pending U.S. Appl. No. 11/975,134, filed Oct. 16, 2007.
Co-pending U.S. Appl. No. 11/966,912, filed Dec. 28, 2007.
Co-pending U.S. Appl. No. 12/131,028, filed May 3, 2008.
Co-pending U.S. Appl. No. 12/336,492, filed Dec. 16, 2008.
Notice of Allowance Mailed Feb. 26, 2007 in Co-pending U.S. Appl. No. 10/778,901, filed Feb. 13, 2004.
Non-Final Office Action Mailed Sep. 22, 2009 in Co-pending U.S. Appl. No. 11/784,307, filed Apr. 5, 2007.
Notice of Allowance Mailed Feb. 27, 2009 in Co-pending U.S. Appl. No. 11/377,859, filed Mar. 15, 2006.
Final Office Action Mailed Aug. 27, 2008 in Co-pending U.S. Appl. No. 11/377,859, filed Mar. 15, 2006.
Non-Final Office Action Mailed Jan. 8, 2008 in Co-pending U.S. Appl. No. 11/377,859, filed Mar. 15, 2006.
Notice of Allowance Mailed Jun. 11, 2009 in Co-pending U.S. Appl. No. 11/326,966, filed Jan. 5, 2006.
Non-Final Office Action Mailed Nov. 10, 2008 in Co-pending U.S. Appl. No. 11/326,966, filed Jan. 5; 2006.
Non-Final Office Action Mailed Aug. 6, 2009 in Co-pending U.S. Appl. No. 11/330,877, filed Jan. 11, 2006.
Final Office Action Mailed Mar. 13, 2009 in Co-pending U.S. Appl. No. 11/330,877, filed Jan. 11, 2006.
Non-Final Office Action Mailed Sep. 11, 2008 in Co-pending U.S. Appl. No. 11/330,877, filed Jan. 11, 2006.
Non-Final Office Action Mailed Dec. 2, 2009 in Co-pending U.S. Appl. No. 11/351,104, filed Feb. 8, 2006.
Final Office Action Mailed Jun. 10, 2009 in Co-pending U.S. Appl. No. 11/351,104, filed Feb. 8, 2006.
Non-Final Office Action Mailed Oct. 28, 2008 in Co-pending U.S. Appl. No. 11/351,104, filed Feb. 8, 2006.
Notice of Allowance Mailed Feb. 23, 2010 in Co-pending U.S. Appl. No. 11/331,789, filed Jan. 14, 2006.
Non-Final Office Action Mailed Aug. 5, 2009 in Co-pending U.S. Appl. No. 11/331,789, filed Jan. 14, 2006.

Final Office Action Mailed Oct. 23, 2008 in Co-pending U.S. Appl. No. 11/331,789, filed Jan. 14, 2006.
Non-Final Office Action Mailed Jun. 13, 2008 in Co-pending U.S. Appl. No. 11/331,789, filed Jan. 14, 2006.
Notice of Allowance Mailed Jun. 16, 2009 in Co-pending U.S. Appl. No. 11/445,750, filed Jun. 1, 2006.
Non-Final Office Action Mailed Feb. 17, 2009 in Co-pending U.S. Appl. No. 11/445,750, filed Jun. 1, 2006.
Final Office Action Mailed May 28, 2009 in Co-pending U.S. Appl. No. 11/417,830, filed May 3, 2006.
Non-Final Office Action Mailed Nov. 14, 2008 in Co-pending U.S. Appl. No. 11/417,830, filed May 3, 2006.
Notice of Allowance Mailed Apr. 23, 2009 in Co-pending U.S. Appl. No. 11/400,165, filed Apr. 5, 2006.
Non-Final Mailed Aug. 19, 2008 in Co-pending U.S. Appl. No. 11/400,165, filed Apr. 5, 2006.
Final Office Action Mailed Jul. 20, 2009 in Co-pending U.S. Appl. No. 11/592,891, filed Nov. 3, 2006.
Non-Final Office Action Mailed Jan. 14 2009 in Co-pending U.S. Appl. No. 11/592,891, filed Nov. 3, 2006.
Final Office Action Mailed Jan. 5, 2010 in Co-pending U.S. Appl. No. 11/595,119, filed Nov. 10, 2006.
Non-Final Office Action Mailed Jul. 21, 2009 in Co-pending U.S. Appl. No. 11/595,119, filed Nov. 10, 2006.
Non-Final Office Action Mailed Aug. 7, 2009 in Co-pending U.S. Appl. No. 11/487,722, filed Jul. 17, 2006.
International Search Report PCT/US05/004702 dated Aug. 10, 2006, pp. 1-3.
Written Opinion PCT/US05/004702 dated Aug. 10, 2006, pp. 1-5.
International Search Report PCT/US06/09525 dated Sep. 13, 2007, pp. 1-2.
Written Opinion PCT/US06/09525 dated Sep. 13, 2007, pp. 1-7.
International Search Report PCT/US06/40498 dated Dec. 28, 2007, pp. 1-2.
Written Opinion PCT/US06/40498 dated Dec. 28, 2007, pp. 1-5.
International Search Report PCT/US07/14847 dated Apr. 1, 2008, pp. 1-4.
Written Opinion PCT/US07/14847 dated Apr. 1, 2008, pp. 1-4.
International Search Report PCT/US07/089134 dated Apr. 10, 2008, pp. 1-3.
Written Opinion PCT/US07/089134 dated Apr. 10, 2008, pp. 1-4.
Notice of Allowance Mailed Mar. 19, 2010, in Co-pending U.S. Appl. No. 11/487,722, filed Jul. 17, 2006.
Co-pending U.S. Appl. No. 12/401,703, filed Mar. 10, 2009.
Co-pending U.S. Appl. No. 12/489,295, filed Jun. 22, 2009.
Acampa and Winters, IEEE Journal on selected Areas in Communications. SAC-5:796-804 (1987).
Acampora and Winters, IEEE Communications Magazine, 25(8):th11-20 (1987).
Bing and Subramanian, IEEE, 1318-1322 (1997).
Durgin, et al., "Measurements and Models for Radio Path Loss and Penetration Loss in and Around Homes and Trees at 5.85 GHz", IEEE Transactions on Communications, vol. 46, No. 11, Nov. 1998.
Fortune et al., IEEE Computational Science and Engineering, "Wise Design of Indoor Wireless Systems: Practical Computation and Optimization", p. 58-68 (1995).
Freret et al., Applications of Spread-Spectrum Radio to Wireless Terminal Communications, Conf. Record. Nat'l Telecom. Conf., Nov. 30-Dec. 4, 1980.
Geier, Jim. Wireless Lans Implementing Interoperable Networks, Chapter 3 (pp. 89-125) Chapter 4 (pp. 129-157) Chapter 5 (pp. 159-189) and Chapter 6 (pp. 193-234), 1999, United States.
Ho et al., "Antenna Effects on Indoor Obstructed Wireless Channels and a Deterministic Image-Based Wide-Based Propogation Model for In-Building Personal Communications Systems", International Journal of Wireless Information Networks, vol. 1, No. 1, 1994.
Kim et al., "Radio Propogation Measurements and Prediction Using Three-Dimensional Ray Tracing in Urban Environments at 908 MHz and 1.9 GHz", IEEE Transactions on Vehicular Technology, vol. 48, No. 3, May 1999.
Kleinrock and Scholl, Conference record 1977 ICC vol. 2 of 3, Jun. 12-15 Chicago Illinois "Packet Switching in radio Channels: New Conflict-Free Multiple Access Schemes for a Small Number of data Users", (1977).
LAN/MAN Standards Committee of the IEEE Computer Society, Part 11:Wireless LAN Medium Access Control (MAC) and Physical Layer (PHY) Specifications:Higher Speed Physical Layer Extension in the 2.4 GHz Band, IEEE Std. 801.11b (1999).
Okamoto and Xu, IEEE, Proceedings of the 13th Annual Hawaii International Conference on System Sciences, pp. 54-63 (1997).
Panjawani et al., "Interactive Computation of Coverage Regions for Wireless Communication in Multifloored Indoor Environments", IEEE Journal on Selected Areas in Communications, vol. 14, No. 3, Apr. 1996.
Perram and Martinez, "Technology Developments for Low-Cost Residential Alarm Systems", Proceedings 1977 Carnahan Conference on Crime Countermeasures, Apr. 6-8, pp. 45-50 (1977).
Piazzi et al., "Acheivable Accuracy of Site-Specific Path-Loss Predictions in Residential Environments", IEEE Transactions on Vehicular Technology, vol. 48, No. 3, May 1999.
Seidel et al, "Site-Specific Propagation Prediction for Wireless In-Building Personal Communications System Design", IEEE Transactions on Vehicular Technology, vol. 43, No. 4, Nov. 1994.
Skidmore et al., "Interactive Coverage Region and System Design Simulation for Wireless Communication Systems in Multi-floored Indoor Environments, SMT Plus", IEEE ICUPC '96 Proceedings (1996).
Ullmo et al., "Wireless Propogation in Buildings: A Statistic Scattering Approach", IEEE Transactions on Vehicular Technology, vol. 48, No. 3, May 1999.

* cited by examiner

WIRELESS LOAD BALANCING

CROSS-REFERENCE TO RELATED APPLICATIONS

This application is a Continuation of U.S. application Ser. No. 11/445,750, filed Jun. 1, 2006, which is incorporated herein in its entirety by reference.

BACKGROUND

Today, 802.11 wireless networks operate in two frequency bands. 802.11b/g in the 2.4 GHz spectrum and 802.11 a in the 5 GHz spectrum. 802.11 wireless clients in most laptops and other devices are shipped with 802.11b/g band as the default band. Indeed, the majority of 802.11 devices are either only in the 802.11b/g band or are preferentially in the 802.11b/g band. In a specific instance at a trade show, it was noted that about 95% of devices at the trade show got onto the 802.11b/g band even though perhaps half of the devices were 802.11a-capable. Over-utilization of the 802.11b/g band can result in throughput degradation and other problems.

It may be beneficial to move "all" 802.11a-capable devices to 802.11a wireless band, and create room in the 802.11b/g band. Most 802.11 Wi-fi phones will be in 802.11b/g band for a long time to come. So moving all the capable data services to the preferred band is welcome move for voice services, so that there are more channels available, for Vo-Wifi services. Moreover, 802.11a may actually have a faster data rate and a higher capacity than the 802.11b/g band, making the 802.11a band even more desirable from a throughput standpoint. In addition, microwaves, cordless phones, and other interfering devices today primarily affect the 2.4 GHz space. So moving normal data services to 802.11a can potentially reduce interference.

Although it may be desirable to migrate wireless clients towards a band that is underutilized, it is not a trivial task and effort is currently being expended to resolve the issues associated with this problem. Even if one band is not necessarily favored, by chance or for other reasons, one band may become over-utilized. In this case, load balancing across the bands may be of value to improve throughput. Proactive techniques may also be of value in ensuring bands are load balanced before the load becomes significantly unbalanced across the bands. On the other hand, migrating wireless clients preferentially from, for example, an 802.11b/g band toward, for example, an 802.11a band can result in over-utilization of the 802.11a band, and a reduction in overall throughput.

These are but a subset of the problems and issues associated with load balancing across bands of a wireless network, and are intended to characterize weaknesses in the prior art by way of example. The foregoing examples of the related art and limitations related therewith are intended to be illustrative and not exclusive. For example, wireless clients may use different protocols other than 802.11, potentially including protocols that have not yet been developed. However, the same problem of excess concentration of users on a single band may persist as long as one band is preferred. Other limitations of the related art will become apparent to those of skill in the art upon a reading of the specification and a study of the drawings.

SUMMARY

The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

A technique for wireless band load balancing involves providing a wireless infrastructure that creates a target band option and helps migrate clients toward that band. An example of a method according to the technique involves, by way of example but not limitation, responding only to probe requests on a first band when a client is detected on the first band and a second band. This method may create a perception, on the part of the client, that a network is only available on the first band. For example, using the techniques described herein, a platform that is both 802.11a and 802.11b/g compliant may attempt to connect preferentially to the 802.11b/g band of a wireless network, and be migrated toward the 802.11a band instead.

A system according to the technique may include, by way of example but not limitation, a received strength signal indicator (RSSI) module, a targeting module, and a service set identifier (SSID) forwarding module. In a non-limiting embodiment, the RSSI module may determine a first signal strength of a platform on a first wireless band and a second signal strength of the platform on a second wireless band. In a non-limiting embodiment, the targeting module may determine that the first wireless band is a target band. In a non-limiting embodiment, the SSID forwarding module may respond to the platform on the target band.

The proposed system can offer, among other advantages, load balancing across bands of a wireless network, which can result in increased capacity on all of the bands. These and other advantages of the present invention will become apparent to those skilled in the art upon a reading of the following descriptions and a study of the several figures of the drawings.

BRIEF DESCRIPTION OF THE DRAWINGS

Embodiments of the invention are illustrated in the figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

Figure 1:
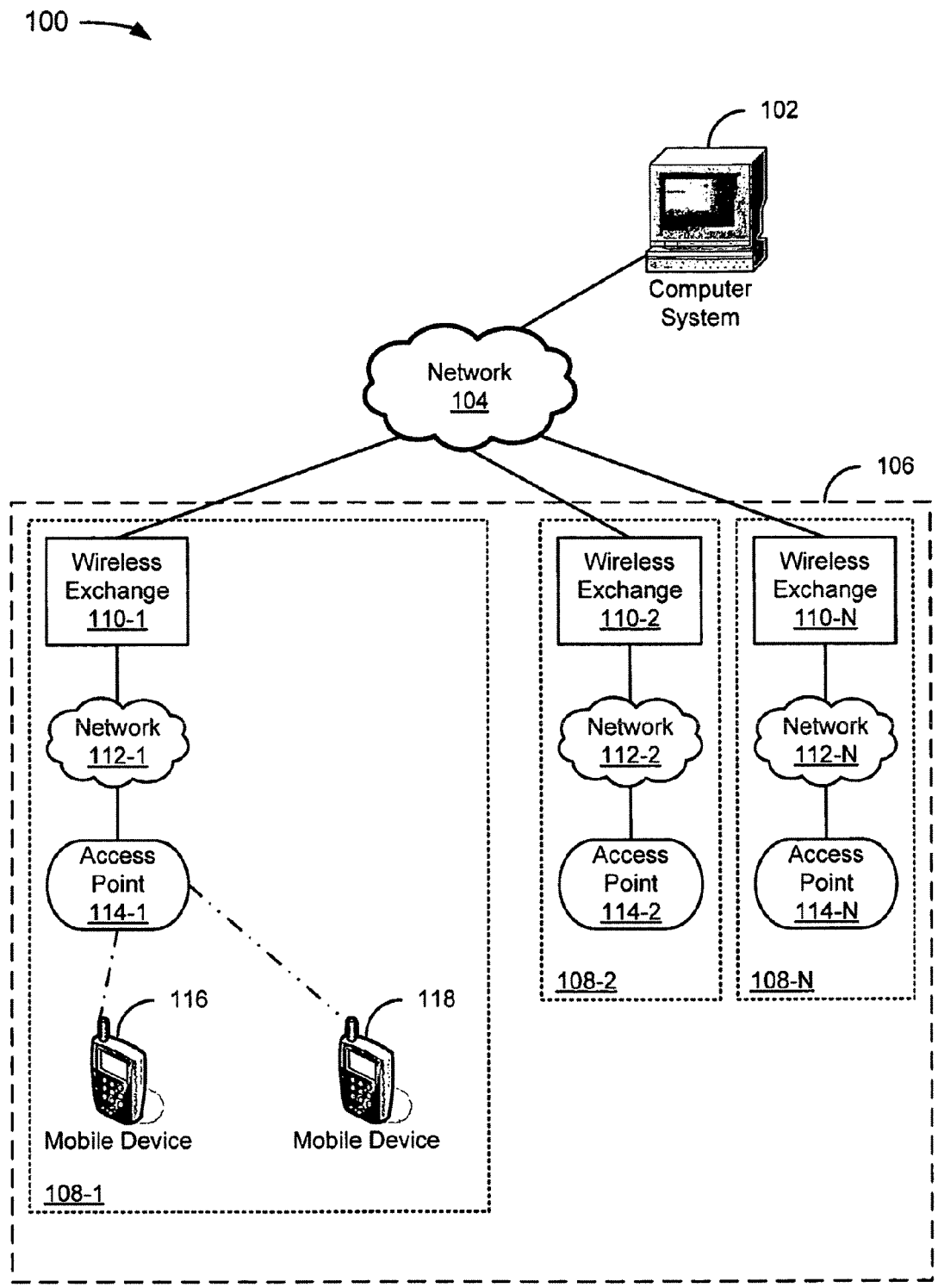
FIG. 1 depicts a system including a wireless access domain.

FIG. 1 depicts a system 100 including a wireless access domain. The system 100 includes a computer system 102, a network 104, and a wireless access domain 106. The system 100 may or may not include multiple wireless access domains. The computer system 102 may be practically any type of device that is capable of communicating with a communications network, such as, by way of example but not limitation, a workstation. The network 104 may be practically any type of communications network, such as, by way of example but not limitation, the Internet. The term "Internet" as used herein refers to a network of networks which uses certain protocols, such as the TCP/IP protocol, and possibly other protocols such as the hypertext transfer protocol (HTTP) for hypertext markup language (HTML) documents that make up the World Wide Web (the web). The physical connections of the Internet and the protocols and communication procedures of the Internet are well known to those of skill in the art.

In a non-limiting embodiment, the computer system 102 may be running a program such as, by way of example but not limitation, ethereal, to decode, by way of example but not limitation, IEEE 802.11 standard packets encapsulated in TZSP that are received from the wireless access domain 106. In a non-limiting embodiment, the computer system 102 is connected to a wireless backbone network (not shown), either directly or indirectly through a wireless network.

In a non-limiting embodiment, the network 104 provides a Layer 2 path for Layer 3 traffic, preserving IP addresses, sessions, and other wired Layer 3 attributes as users roam throughout the wireless access domain 106. The network may or may not include a wireless backbone network, or be connected directly or indirectly to a wireless backbone network. Communications between the computer system 102 and the wireless access domain 106 are, therefore, Layer 3 traffic tunneled through Layer 2. Advantageously, by tunneling Layer 3 traffic at Layer 2, users stay connected with the same IP address and keep the same security and Quality of Service (QoS) policies from the wired network while they roam the wireless side. Since Layer 3 attributes are maintained, mobile devices that are connected to the wireless access domain 106 can retain persistent identities.

The seven layers of the Open System Interconnection (OSI) model, of which Layers 2 and 3 are a part, are well-known to those of skill in the relevant art, and are, therefore, not described herein in any substantial detail. It should be noted, however, that Layer 3 is known as the "Network Layer" because it provides switching and routing technologies, creating logical paths, known as virtual circuits, for transmitting data from node to node. Routing and forwarding are functions of this layer, as well as addressing, internetworking, error handling, congestion control and packet sequencing. Layer 2 is known as the "Data Link Layer" because at Layer 2 data packets are encoded and decoded into bits; and Layer 2 furnishes transmission protocol knowledge and management and handles errors in the physical layer, flow control and frame synchronization. The data link layer is divided into two sublayers: The Media Access Control (MAC) layer and the Logical Link Control (LLC) layer. The MAC sublayer controls how a computer on the network gains access to the data and permission to transmit it. The LLC layer controls frame synchronization, flow control, and error checking.

In non-limiting embodiments, the wireless access domain 106 may be referred to as, by way of example but not limitation, a Local Area Network (LAN), virtual LAN (VLAN), and/or wireless LAN (WLAN). The wireless access domain 106 gives each user a persistent identity that can be tracked and managed, no matter where they roam. The wireless access domain 106 may have one or more associated snoop filters. In an embodiment, the wireless access domain 106 may include one or more radios.

In the example of FIG. 1, the wireless access domain 106 includes access areas 108-1 to 108-N (hereinafter collectively referred to as access areas 108). The access areas 108 have characteristics that depend upon, among other things, a radio profile. A radio profile is a group of parameters such as, by way of example but not limitation, beacon interval, fragmentation threshold, and security policies. In an embodiment, the parameters may be configurable in common across a set of radios in one or more access areas 108. In another embodiment, a few parameters, such as the radio name and channel number, must be set separately for each radio. An example of the implementation of a wireless access domain, provided by way of example but not limitation, includes a Trapeze Networks "identity-aware" Mobility Domain™.

In the example of FIG. 1, the following elements are associated with each of the access areas 108: Wireless exchange switches 110-1 to 110-N (hereinafter collectively referred to as wireless exchange switches 110), networks 112-1 to 112-N (hereinafter collectively referred to as networks 112), and access points 114-1 to 114-N (hereinafter collectively referred to as access points 114). In an embodiment, the wireless exchange switches 110 swap topology data and client information that details each user's identity, location, authentication state, VLAN membership, permissions, roaming history, bandwidth consumption, and/or other attributes assigned by, by way of example but not limitation, an Authentication, Authorization, and Accounting (AAA) backend (not shown). In an embodiment, the wireless exchange switches 110 provide forwarding, queuing, tunneling, and/or some security services for the information the wireless exchange switches 110 receive from their associated access points 114. In another embodiment, the wireless exchange switches 110 coordinate, provide power to, and/or manage the configuration of the associated access points 114. An implementation of a wireless exchange switch, provided by way of example but not limitation, includes a Trapeze Networks Mobility Exchange™ switch. The Trapeze Networks Mobility Exchange™ switches may, in another implementation, be coordinated by means of the Trapeze Access Point Access (TAPA) protocol.

In an embodiment, the networks 112 are simply wired connections from the wireless exchange switches 110 to the access points 114. The networks 112 may or may not be part of a larger network. In a non-limiting embodiment, the networks 112 provides a Layer 2 path for Layer 3 traffic, preserving IP addresses, sessions, and other wired Layer 3 attributes as users roam throughout the wireless access domain 106. Advantageously, by tunneling Layer 3 traffic at Layer 2, users stay connected with the same IP address and keep the same security and Quality of Service (QoS) policies from the wired network while they roam the wireless side.

In a non-limiting embodiment, the access points 114 are hardware units that act as a communication hub by linking wireless mobile 802.11 stations such as PCs to a wired backbone network. In an embodiment, the access points 114 connect users to other users within the network and, in another embodiment, can serve as the point of interconnection between a WLAN and a fixed wire network. The number of users and size of a network help to determine how many access points are desirable for a given implementation. An implementation of an access point, provided by way of example but not limitation, includes a Trapeze Networks Mobility System™ Mobility Point™ (MP™) access point.

The access points 114 are stations that transmit and receive data (and may therefore be referred to as transceivers) using one or more radio transmitters. For example, an access point may have two associated radios, one which is configured for IEEE 802.11a standard transmissions, and the other which is configured for IEEE 802.11b standard transmissions. In a non-limiting embodiment, an access point transmits and receives information as radio frequency (RF) signals to and from a wireless client over a 10/100BASE-T Ethernet connection. The access points 114 transmit and receive information to and from their associated wireless exchange switches 110. Connection to a second wireless exchange switch provides redundancy.

A station, as used herein, may be referred to as a device with a media access control (MAC) address and a physical layer (PHY) interface to the wireless medium that comply with the IEEE 802.11 standard. As such, in a non-limiting embodiment, the access points 114 are stations. Similarly, a wireless client 116 and a wireless client 118, which, in the example of FIG. 1, are depicted for illustrative purposes in the access area 108-1, may be implemented as stations. In alternative embodiments, a station may comply with a different standard than IEEE 802.11, and may have different interfaces to a wireless or other medium.

In the example of FIG. 1, the wireless client 116 and the wireless client 118 are connected to the wireless network through the access point 114-1. For illustrative purposes, the wireless connections of the wireless client 116 and the wireless client 118 are different. For example, the wireless client 116 may be connected to the wireless network over an 802.11a band, while the wireless client 118 may be connected to the wireless network over an 802.11b/g band. Although FIG. 1 is not intended to reflect a physical system but rather serve as a conceptual drawing, the wireless client 118 is assumed to be physically further from the access point 114-1 than the wireless client 116.

In operation, the system 100 may incorporate received strength signal indicator (RSSI) tracking to make clients that are physically far from any access point to associate in the 802.11b/g band even if the clients are heard on the 802.11a band. Alternatively, the physically distant clients may associated in the 802.11b/g band if they are not heard as good on the 802.11a band. This may prevent clients that have weaker 802.11a implementations and that are physically on the outer fringes of wireless networks to still be able to connect to the network and use the network effectively. RSSI tracking is but one example of how to keep clients that are physically distant from an access point to associate in, for example, the 802.11b/g band.

Figure 2:
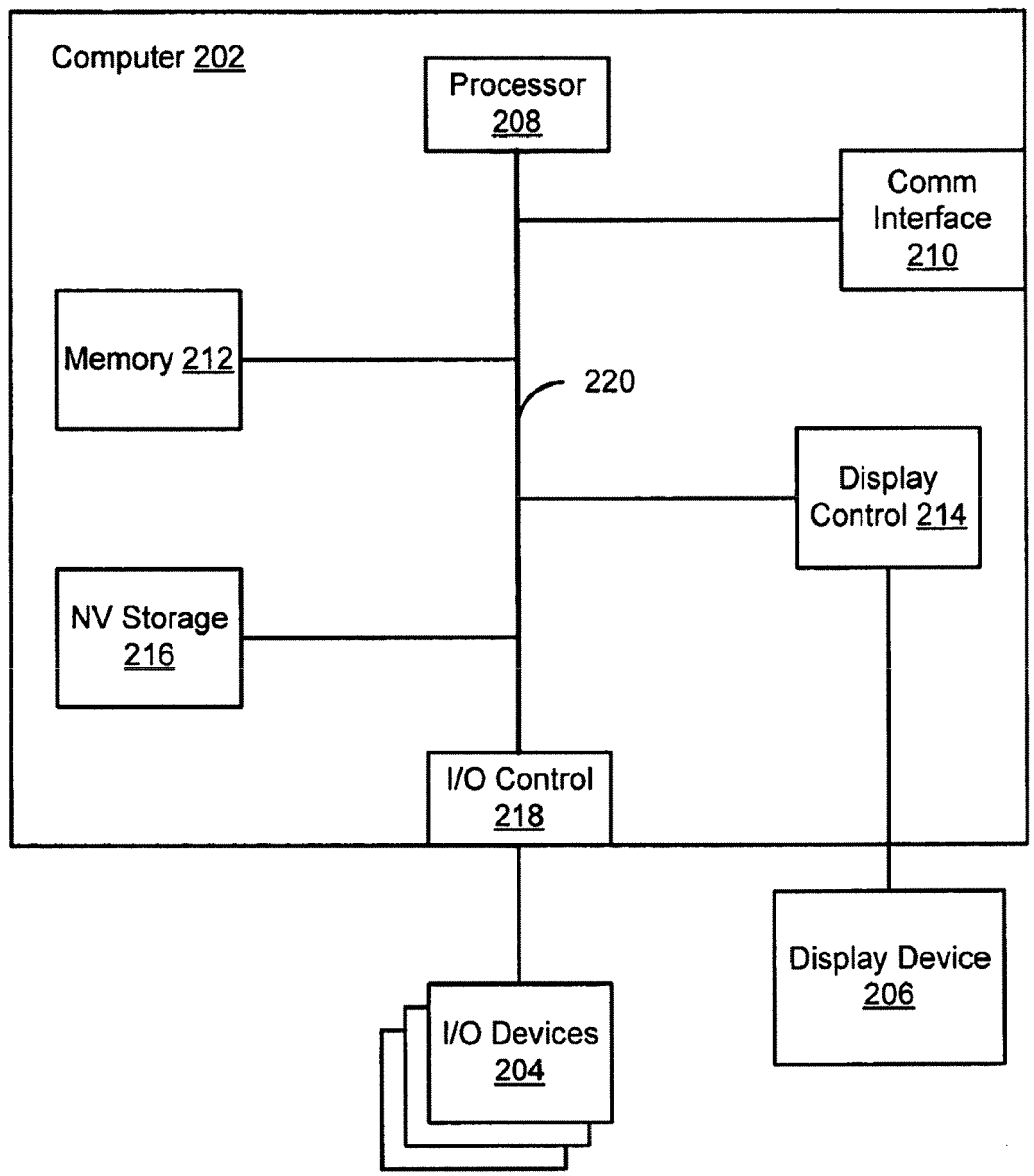
FIG. 2 depicts a computer system for use in the system of FIG. 1.

FIG. 2 depicts a computer system 200 for use in the system 100 (FIG. 1). The computer system 200 may be a conventional computer system that can be used as a client computer system, such as a wireless client or a workstation, or a server computer system. The computer system 200 includes a computer 202, I/O devices 204, and a display device 206. The computer 202 includes a processor 208, a communications interface 210, memory 212, display controller 214, non-volatile storage 216, and I/O controller 218. The computer 202 may be coupled to or include the I/O devices 204 and display device 206.

The computer 202 interfaces to external systems through the communications interface 210, which may include a modem or network interface. It will be appreciated that the communications interface 210 can be considered to be part of the computer system 200 or a part of the computer 202. The communications interface 210 can be an analog modem, ISDN modem, cable modem, token ring interface, satellite transmission interface (e.g. "direct PC"), or other interfaces for coupling a computer system to other computer systems.

The processor 208 may be, for example, a conventional microprocessor such as an Intel Pentium microprocessor or Motorola power PC microprocessor. The memory 212 is coupled to the processor 208 by a bus 220. The memory 212 can be Dynamic Random Access Memory (DRAM) and can also include Static RAM (SRAM). The bus 220 couples the processor 208 to the memory 212, also to the non-volatile storage 216, to the display controller 214, and to the I/O controller 218.

The I/O devices 204 can include a keyboard, disk drives, printers, a scanner, and other input and output devices, including a mouse or other pointing device. The display controller 214 may control in the conventional manner a display on the display device 206, which can be, for example, a cathode ray tube (CRT) or liquid crystal display (LCD). The display controller 214 and the I/O controller 218 can be implemented with conventional well known technology.

The non-volatile storage 216 is often a magnetic hard disk, an optical disk, or another form of storage for large amounts of data. Some of this data is often written, by a direct memory access process, into memory 212 during execution of software in the computer 202. One of skill in the art will immediately recognize that the terms "machine-readable medium" or "computer-readable medium" includes any type of storage device that is accessible by the processor 208 and also encompasses a carrier wave that encodes a data signal.

The computer system 200 is one example of many possible computer systems which have different architectures. For example, personal computers based on an Intel microprocessor often have multiple buses, one of which can be an I/O bus for the peripherals and one that directly connects the processor 208 and the memory 212 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 212 for execution by the processor 208. A Web TV system, which is known in the art, is also considered to be a computer system, but it may lack some of the features shown in FIG. 2, such as certain input or output devices. A typical computer system will usually include at least a processor, memory, and a bus coupling the memory to the processor.

In addition, the computer system 200 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 216 and causes the processor 208 to execute the various acts required by the operating system to input and output data and to store data in memory, including storing files on the non-volatile storage 216.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 3:
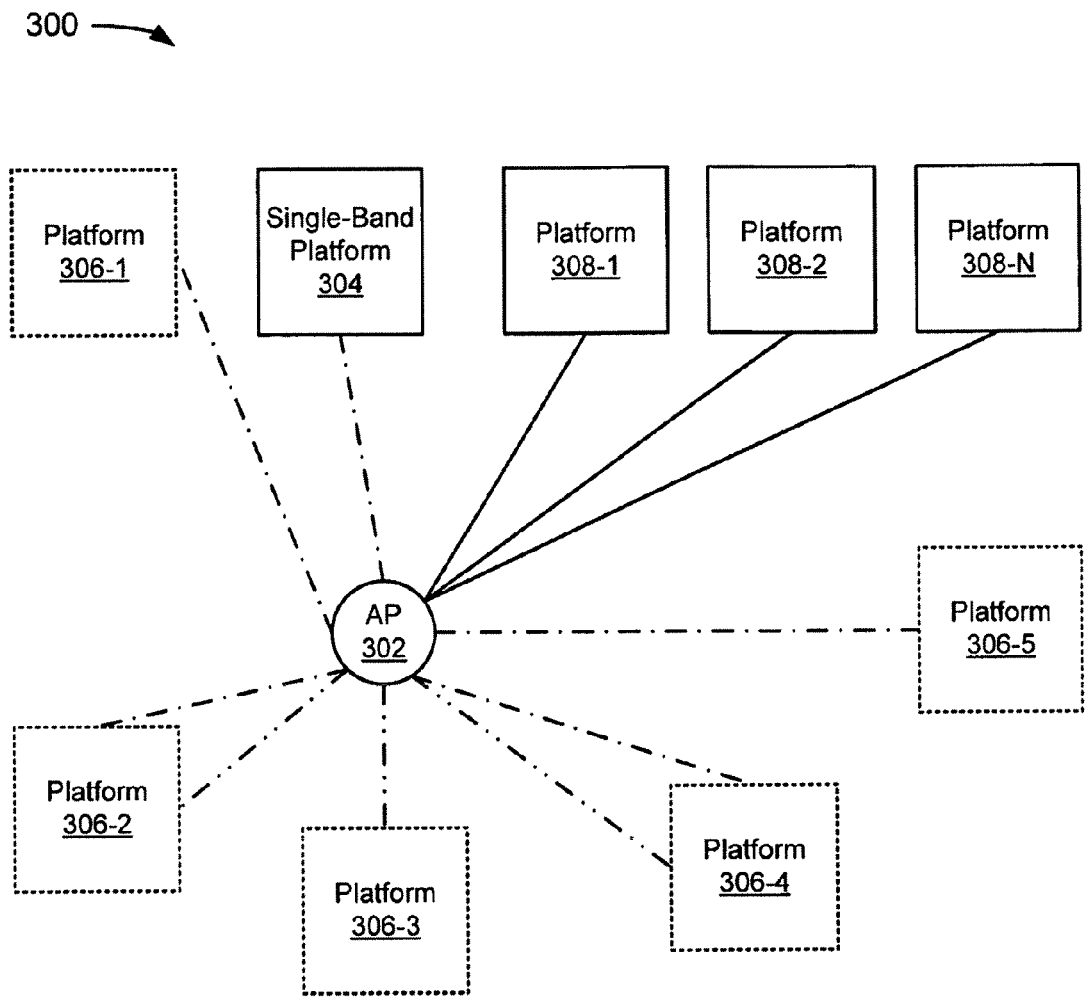
FIG. 3 depicts a conceptual diagram an example of a system including a platform operable on multiple wireless bands.

FIG. 3 depicts a conceptual diagram an example of a system 300 including a platform operable on multiple wireless bands. In the example of FIG. 3, the system 300 includes a wireless access point 302, a single-band platform 304, a moveable platform 306, and a plurality of platforms 308-1 to 308-N (referred to collectively as platforms 308). The moveable platform 306 is depicted in 5 dashed boxes 306-1 to 306-5. As will be described, the moveable platform 306 is so depicted in order to explain changes over time.

In the example of FIG. 3, the single-band platform 304 is connected to a wireless network through the wireless access point 302. The single-band platform 304 may, depending upon the embodiment, implementation, or device, be capable of connecting only on a single band such as, by way of example but not limitation, the 802.11b/g band. Alternatively, the single-band platform 304 may be sending and/or receiving data that would operate most effectively on a single band of a multi-band network. For example, VoIP is preferentially performed on the 802.11b/g band, as opposed to the 802.11a band. Thus, the characterization of the single-band platform 304 may be a self-imposed characterization (e.g., the single-band platform 304 only attempts to connect over a preferred band). In the example of FIG. 3, the platform 306 is depicted as changing over time (platform 306-1 to 306-5). At the time period associated with 306-1, the platform 306 is connected to the wireless network over a first band. The first band may be a preferred band (e.g., some devices that are multi-band capable preferentially attempt to connect over the 802.11b/g band). Alternatively, the first band may have a stronger associated signal.

Figure 4:
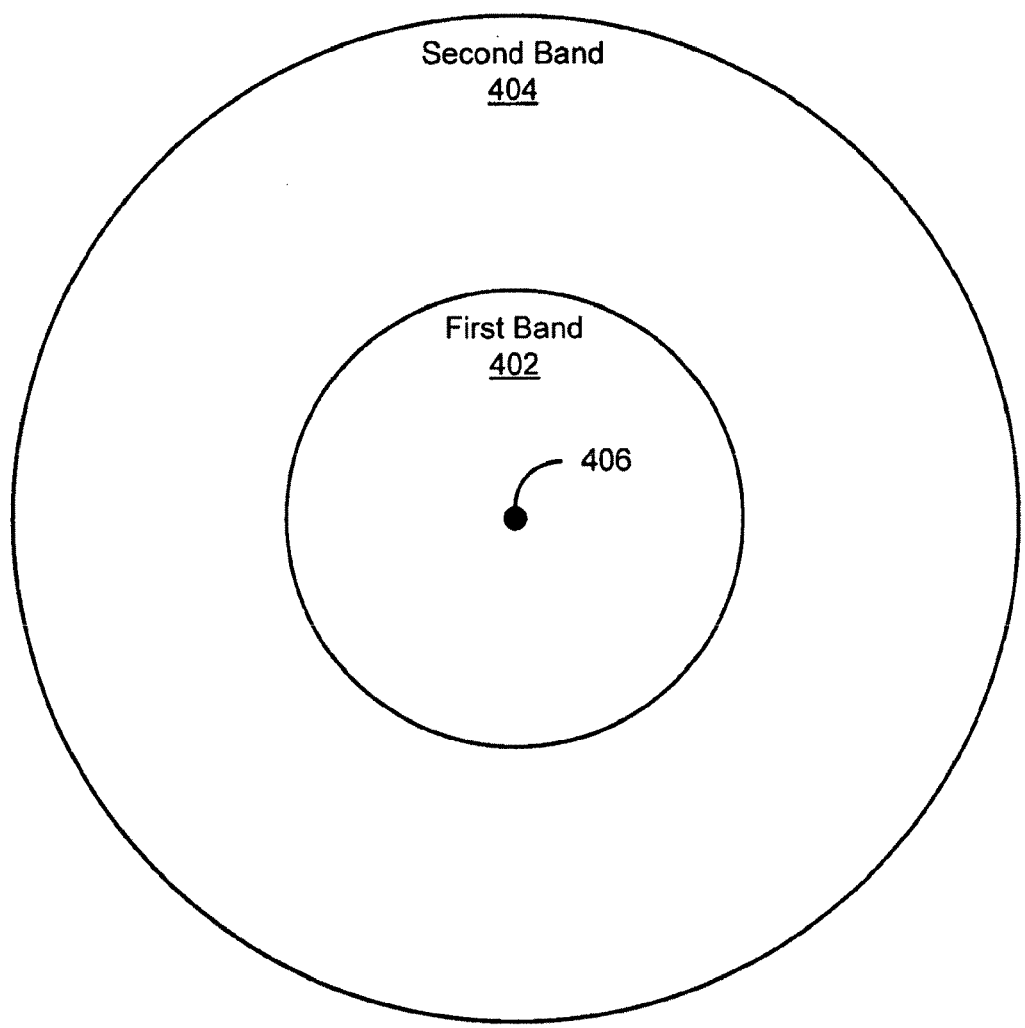
FIG. 4 depicts a graphic illustration in which an acceptable signal strength threshold is met for two bands.

FIG. 4 depicts a graphic illustration 400 in which an acceptable signal strength threshold is met for two bands. In the example of FIG. 4, the first band 402 has a wider radius of coverage from a central point 406, which may be an access point, compared to the radius of coverage of a second band 404. By way of example but not limitation, the first band 402 may be an 802.11b/g band and the second band 404 may be an 802.11a band. 802.11b/g typically has a larger radius of coverage compared to 802.11a for reasons, such as data rate associated with the bands, that are known to one of skill in the art. It may be noted that the first band 402 and the second band 404 could have different coverage based on other factors including, but not limited to, interference in one of the bands, an environment that relatively favors one band, a weaker transmitter or receiver on one of the bands (either on the platform or at the wireless access point), or some other factor.

Referring once again to FIG. 3, at the time period associated with 306-2, the platform 306 remains connected via the first band, but signals are sent over a second band. It may be noted that the signals may have been sent during the time period associated with 306-1 as well, but a distinction is drawn for illustrative purposes only. The access point 302 (or some device higher up, such as a switch or a server) determines whether a connection should be made via the first band or the second band. The determination may be based on, for example, whether it is desirable to keep the first band as clear as possible of traffic so that the single-band platform 304 can connect via the first band, the amount of traffic on the first and second bands from the platforms 308, the RSSI of the platform 306 is higher on the first band or the second band, or other factors, or a combination of factors. In an embodiment, the time period associated with 306-2 lasts for a predetermined period of time, although the period of time may be dynamic (e.g., quicker when RSSI changes rapidly or quicker if traffic is exceptionally heavy on one band or the other) or arbitrary.

In the example of FIG. 3, when the access point 302 has heard, for example, probe requests from the platform 306 for a period of time, at the time period associated with 306-3, the platform 306 is connected via the second band, and the access point 302 may stop responding to probe requests on the first band. When the access point 302 stops responding to the platform 306 on the first band, this simulates to the platform 306 as if a service set identifier (SSID) associated with the second band is the only one being offered. As is known in the relevant art, a SSID is a sequence of characters that uniquely names a WLAN.

In an embodiment, the platforms 308 are connected to the wireless network over the first band if possible, and over the second band if far away or if the platform is single-band only. It should be noted that this is not necessarily a bad thing. For example, if the second band is 802.11b/g and the first band is 802.11a, measurements of throughput have shown that devices today tend toward the 802.11b/g band and some devices are not capable of accessing the 802.11a band. It is estimated that even if the migration is performed toward 802.11a when signal strength is good, throughput may be maintained, in many instances, at a reasonable level.

In the example of FIG. 3, at the time period associated with 306-4, the access point 302 entertains the option of enabling the platform 306 to switch from the first band back to the second band. For example, the platform at the time period associated with 306-4 may have poor signal quality on the first band. Again, the access point 302 (or some other device) may consider multiple factors when deciding whether switching back to the second band is appropriate. For example, the access point 302 may be able to determine that the platform 306 is on the fringe of the radius of coverage of the first band by comparing RSSI values to a range of acceptable values. If the platform 306 drops below an acceptable RSSI threshold, the access point 302 can, potentially seamlessly, enable probe responses on the second band.

It may be noted that the RSSI threshold may be a static or dynamic value. By way of example but not limitation, the RSSI threshold may be the highest RSSI value other than the current band. In such an embodiment, the RSSI value could remain relatively steady over time, but the RSSI threshold could rise, causing the RSSI value to become unacceptable.

In the example of FIG. 3, at the time period associated with 306-5, the platform 306 is back on the second band. In the near future, it is predicted that VoIP wireless devices will continue to dominate the 802.11b/g band. Advantageously, this technique can migrate non-VoIP devices away from the 802.11b/g band, freeing up the band for VoIP. However, as previously mentioned, it may be desirable to allow access by non-VoIP devices under certain circumstances (e.g., the devices do not exceed an acceptable RSSI threshold on the other band or bands) that have just been described with reference to FIG. 3.

Although the techniques have been described with respect to two bands, 802.11a and 802.11b/g, where 802.11a is the target band to which devices are migrated, the techniques could be used in conjunction with a third (fourth, etc.) band. For more than two protocols, devices may be migrated toward a target band of the more than two bands. In certain cases, devices may be unable to migrate toward the target band (e.g., because the devices are not capable of operating on the target band) or migration toward the target band is undesirable (e.g., because of signal strength, data rate, and/or other factors). Although the techniques have been described with respect to two bands, 802.11a and 802.11b/g, the techniques could be used in conjunction with a different standard (or two or more protocols). For protocols other than 802.11, the technique is readily applicable.

In an embodiment, one of the factors used in load balancing may be access point occupancy. For example, access points may have overlapping areas of coverage. If it is determined that a first access point is busier than a second access point, the system may preferentially migrate the platform from the first access point to the second access point.

In an embodiment, the target band is adjustable. For example, if it is determined that a band other than the target band would be more advantageous as a target band, then the other band can be set as the target band. As before, certain characteristics of non-target bands may override the preference (e.g., if signal strength does not exceed an acceptable RSSI threshold, or if the data is of a particular type).

Figure 5:
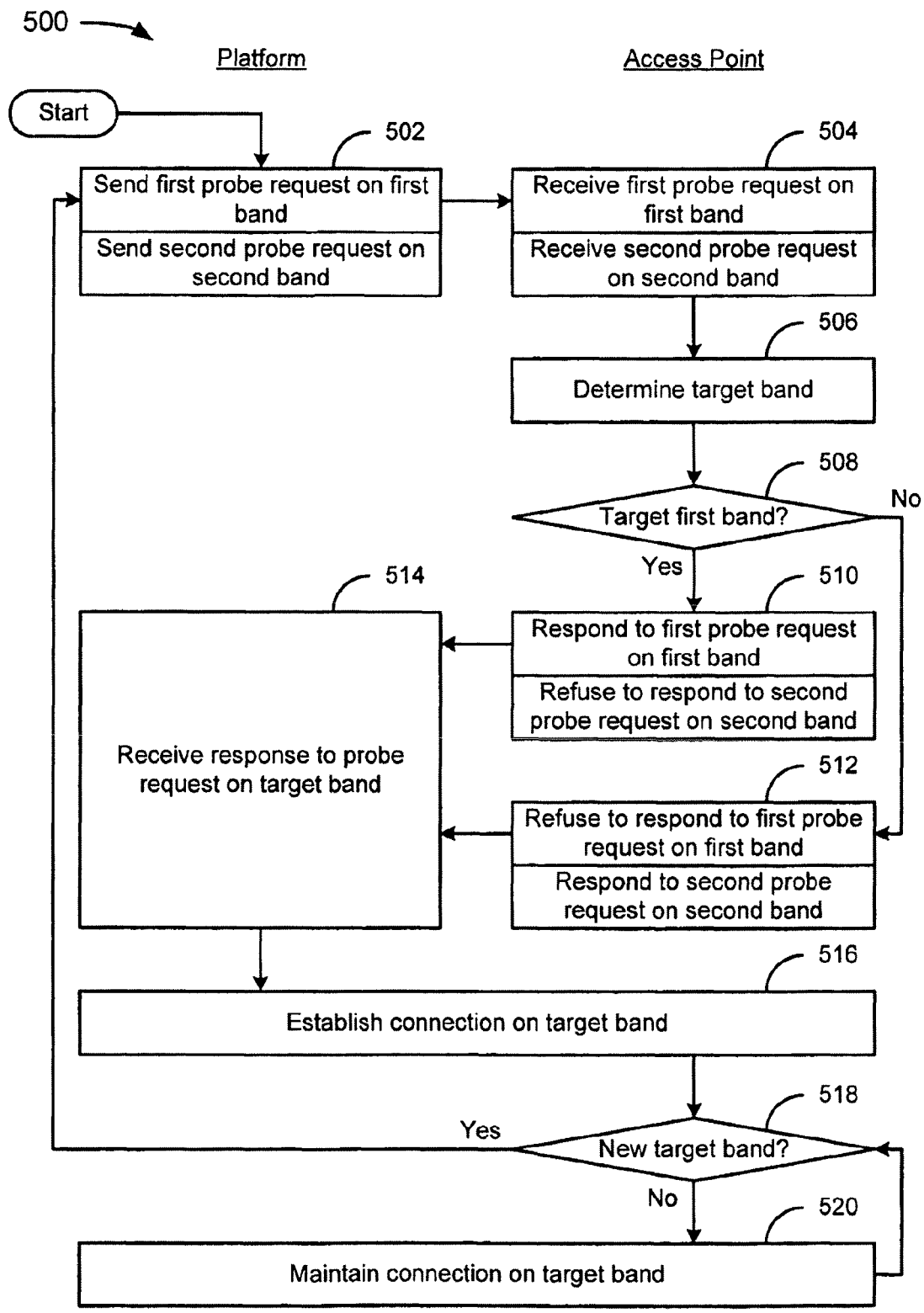
FIG. 5 depicts a flowchart of an example of a method for load balancing a wireless network.

FIG. 5 depicts a flowchart 500 of an example of a method for load balancing a wireless network. This method and other methods are depicted as serially arranged modules. However, modules of the methods may be reordered, or arranged for parallel execution as appropriate. FIG. 5 is intended to illustrate a first example of operation of a system such as that depicted in FIG. 3, using the techniques described herein. In the example of FIG. 5, the flowchart is arranged such that, in general, modules associated with a platform are on the left-hand side and modules associated with an access point are on the right-hand side. This organization is for illustrative purposes only.

In the example of FIG. 5, the flowchart 500 starts at module 502 where a first probe request is sent from the platform on a first band, and a second probe request is sent from the platform on a second band. Implicit in module 502 is that the platform is capable of sending probe requests on at least two bands. However, the platform may be capable of operating on more than two bands, and may therefore send probe requests on more than two bands.

In the example of FIG. 5, the flowchart 500 continues to module 504 where the first probe request is received at the access point on the first band, and the second probe request is received at the access point on the second band. Implicit in module 504 is that the access point is capable of sending probe request on at least two bands. However, the platform may be capable of operating on more than two bands, and may or may not receive probe requests on more than two bands. It should be noted that an access point could be configured to operate on only one band. In such a case, multiple access points capable of operation on multiple bands could be used together to gain at least some of the advantages associated with this technique.

In the example of FIG. 5, the flowchart 500 continues to module 506 where the access point determines the target band. The target band may be determined in a number of ways. For example, a human or software agent may arbitrarily (or for reasons not considered by the system) select a target band. As another example, the target band may be selected using network traffic considerations such as congestion on one or more bands, available bandwidth on one or more of the bands, high or low throughput on one or more of the bands, etc. As another example, the target band may be selected on a platform-by-platform basis, such as based upon signal strengths associated with a platform on the various bands.

In the example of FIG. 5, the flowchart 500 continues to decision point 508 where it is determined whether to target the first band. It should be noted that the example of FIG. 5 describes only a first and second band, but the target band could be chosen from any number of bands. If it is determined that the first band is the target band (508-Yes), then the flowchart continues to module 510 where the access point responds to the first probe request on the first band, and refuses to respond to the second probe request on the second band. If, on the other hand, it is determined that the second band is the target band (508-No), then the flowchart continues to module 512 where the access point refuses to respond to the first probe request on the first band, and responds to the second probe request on the second band.

In the example of FIG. 5, the flowchart 500 continues to module 514 where the response to probe request is received at the platform on the target band. Depending upon the determination at module 506, the target band may be either the first band or the second band. It should be noted that since the platform only received a response to probe request on the target band, and not the other band, from the perspective of the platform, only the target band is currently available.

In the example of FIG. 5, the flowchart 500 continues to module 516 where a connection is established on the target band. The connection may be established between the platform and the access point by any known or convenient protocol, procedure, or means.

In the example of FIG. 5, the flowchart 500 continues to decision point 518 where it is determined whether to select a new target band. The determination may be based on factors similar to those described with respect to module 506. By way of example but not limitation, it may be desirable to select a new target band if a detected signal strength on the target band drops below an acceptable signal strength threshold, or if the signal strength on the target band is lower than on a non-target band by a certain margin. If it is determined that an attempt to select a new target band should be made (518-Yes), then the flowchart 500 returns to the beginning (module 502) and proceeds as described above. If, on the other hand, it is determined that an attempt to select a new target band should not be made (518-No), then the flowchart 500 continues to module 520 where the connection is maintained on the target band, and the flowchart returns to decision point 518 and repeats until it is determined that an attempt should be made to select a new target band, if ever.

Figure 6:
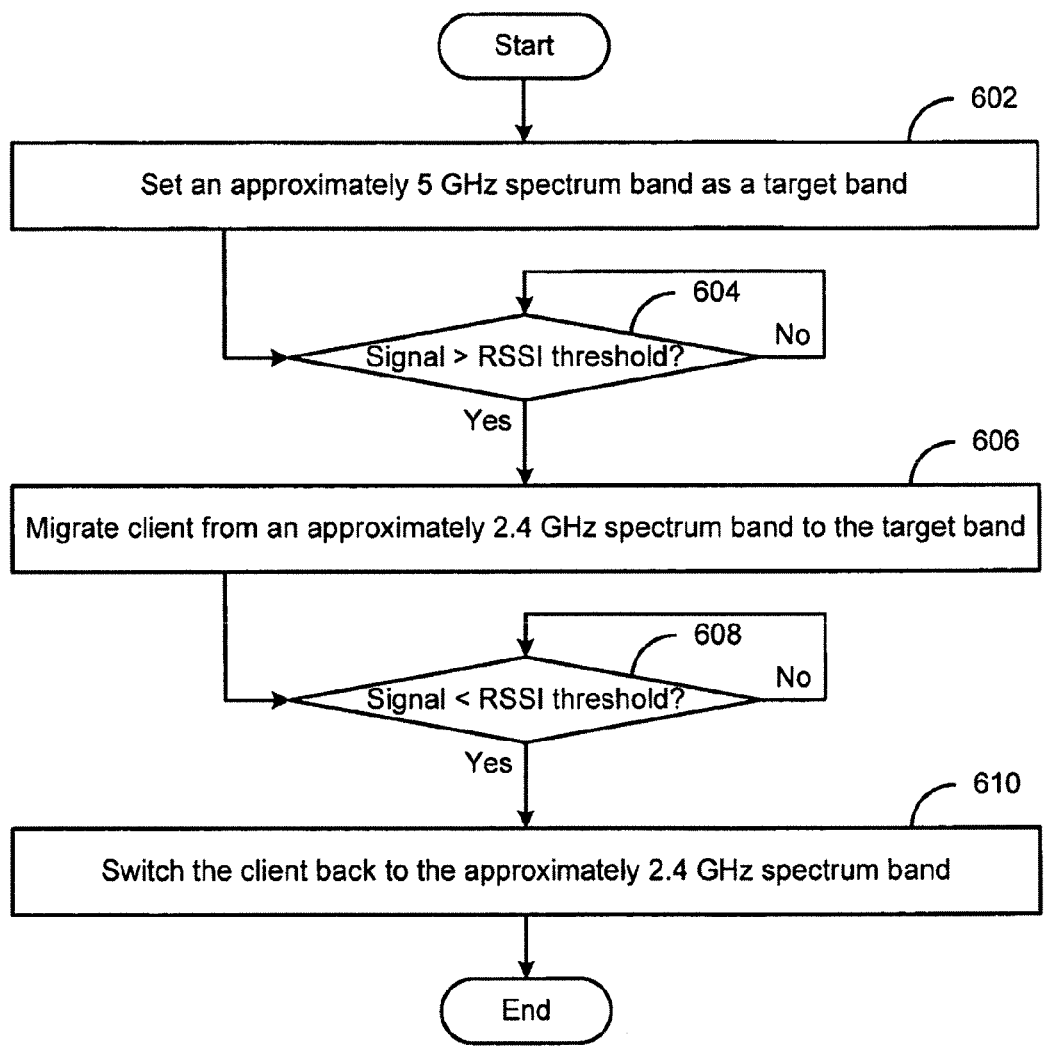
FIG. 6 depicts a flowchart of an example of a method for wireless load balancing on 5 GHz and 2.4 GHz spectral bands.

FIG. 6 depicts a flowchart 600 of an example of a method for wireless load balancing on 5 GHz (which may or may not include an 802.11b/g band) and 2.4 GHz (which may or may not include an 802.11a band) spectrum bands. The flowchart 600 begins at module 602 where an approximately 5 GHz spectrum band is set as a target band. The setting of the target band may be based upon any known or convenient load balancing considerations including but not limited to traffic characteristics on the various bands, platform characteristics, access point characteristics, or other characteristics.

In an embodiment, the target band can be changed at a later time.

In the example of FIG. 6, the flowchart 600 continues to decision point 604 where it is determined whether a detected signal on the target band is higher than an RSSI threshold. If not (604-No), the flowchart 600 repeats decision point 604 until this condition is true, if ever. If, on the other hand, it is determined that the detected signal on the target band is higher than the RSSI threshold (604-Yes), then the flowchart 600 continues to module 606 where a client associated with the detected signal strength is migrated from the 2.4 GHz spectrum band to the target band. In an embodiment that includes multiple other bands (besides the 2.4 GHz spectrum band), the migration may be carried out for clients on those other bands. In another embodiment, all clients that are compatible with the target band may be migrated from the 2.4 GHz spectrum band to the target band if the respective detected signal strengths exceed the RSSI threshold.

In the example of FIG. 6, the flowchart 600 continues to decision point 608 where it is determined whether a detected signal on the target band has dropped below the RSSI threshold. If not (608-No), then the flowchart 600 repeats decision point 608 until this condition is true, if ever. If, on the other hand, it is determined that the detected signal on the target band has dropped below the RSSI threshold (608-Yes), then the flowchart 600 continues to module 610 where the client is switched back to the 2.4 GHz spectrum band. At this point, the flowchart 600 ends. Of course, depending upon the embodiment and/or implementation, the client could presumably switch between bands any number of times.

In an embodiment, the method may further include disabling the migrating and switching based upon network traffic characteristics. For example, congestion on one or more bands may result in an override of the signal strength-dependent migration.

Figure 7:
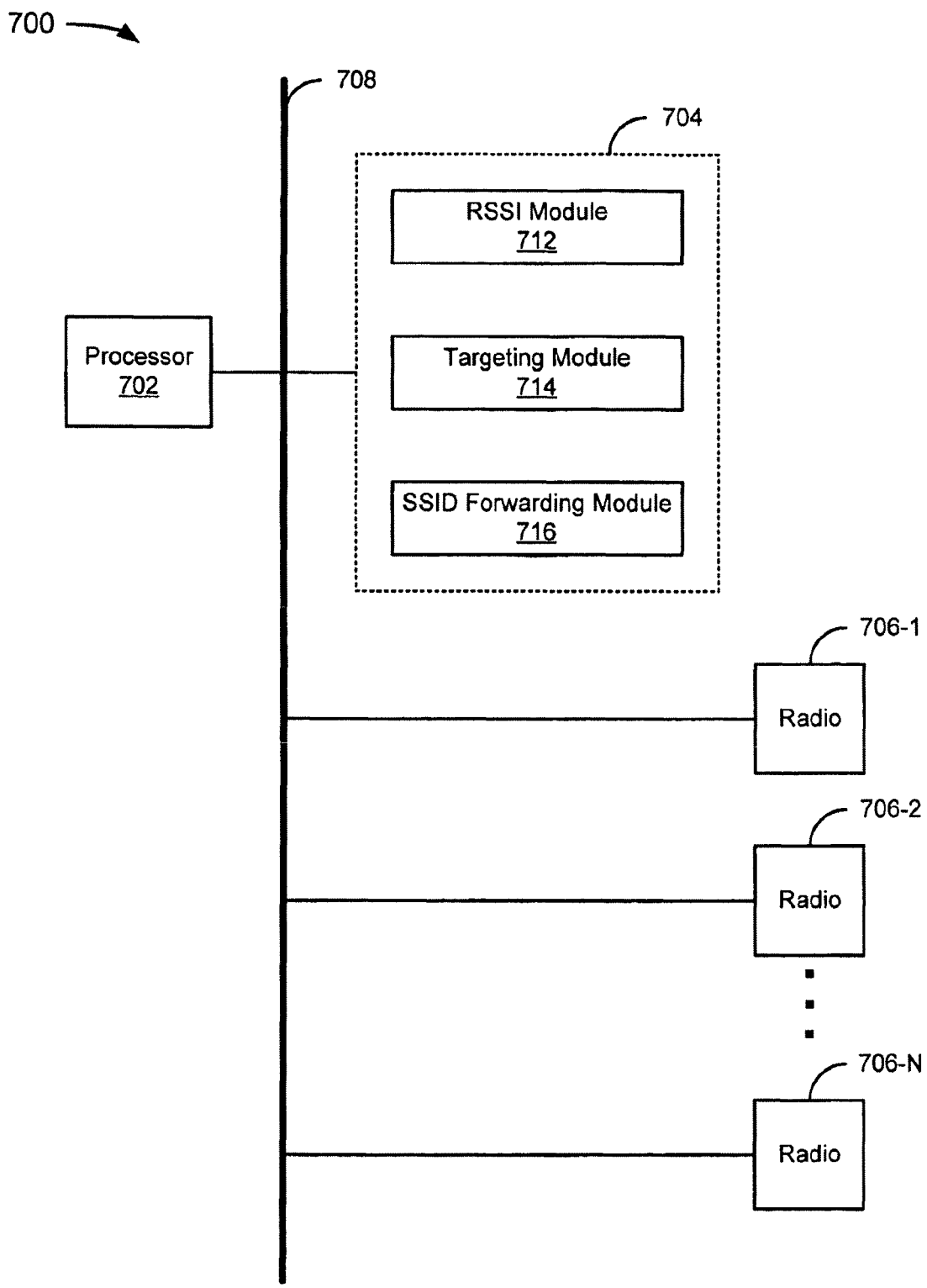
FIG. 7 depicts an example of a wireless band load balancing device.

FIG. 7 depicts an example of a wireless band load balancing device 700. The device 700 may be, by way of example but not limitation, a wireless access point. In the example of FIG. 7, the device 700 includes a processor 702, memory 704, and radios 706-1 to 706-N (referred to collectively as radios 706), coupled to a bus 708. It may be noted that the bus architecture is optional, and is selected for ease of illustration, but any applicable known or convenient architecture would suffice.

In the example of FIG. 7, the memory 704, which may include volatile and/or non-volatile storage, or software, firmware, and/or hardware components, includes an RSSI module 712, a targeting module 714, and an SSID forwarding module 716. While the modules 712, 714, and 716 are depicted as residing locally on the device 700, one, some, or all of the modules could instead be located on another remote device, such as a switch, a server, or some other computer.

In the example of FIG. 7, the radios 706 are intended to represent radios on different bands. However, a single radio could be used to cover multiple bands, or multiple radios could cover a single band, depending upon implementation. For illustrative purposes only, it is assumed that the radios 706 are associated with different bands.

In operation, the radios 706 receive signals from platforms (not shown). The signals are evaluated by the RSSI module to determine the strength of the signals. It may be noted that since the RSSI module typically receives a subset of all signals sent by the platforms, so the RSSI value associated with a signal is an estimation of actual average signals strength. In general, the larger the sample, the greater the accuracy. Each signal has an RSSI value. For example, if a platform has signals sampled on each of the bands, each of the signals have an RSSI value. If multiple signals associated with a platform are sampled on a single band, the RSSI value may be an average of the signals.

In operation, the targeting module 714 determines which band is a targeted band. The determination may be made by assignment, consideration of traffic characteristics, using RSSI values on a platform-by-platform basis, or by some other means or combination. For example, if the targeting module 714 determines the target band based on RSSI values for a platform on the various bands, the targeting module 714 may select the band with the highest associated RSSI values as the target band. As another example, the targeting module 714 may require that certain bands have a higher associated RSSI value by a margin. As another example, RSSI values may be weighted depending upon traffic characteristics of the associated bands.

In operation, when the targeting module 714 establishes a target band, the SSID forwarding module 716 sends a message, through the associated radio, to the relevant platform. For example, the SSID forwarding module 716 may respond to probe requests from a platform on the target band. Notably, in an embodiment that uses probe requests, the SSID forwarding module 716 refuses to response to probe requests on non-target bands. Thus, the platform will believe it has only a single choice—the target band.

It may be noted that the description above applies to platforms that are attempting to connect to a wireless network for the first time, or attempting to reconnect. For example, the RSSI module may determine that RSSI values are higher on a first band initially, the first band becoming the target band, but that RSSI values are higher on a second band later, and change the target band to the second band in response.

As used herein, a wireless network refers to any type of wireless network, including but not limited to a structured network or an ad hoc network. Data on a wireless network is often encrypted. However, data may also be sent in the clear, if desired. With encrypted data, a rogue device will have a very difficult time learning any information (such as passwords, etc.) from clients before countermeasures are taken to deal with the rogue. The rogue may be able to confuse the client, and perhaps obtain some encrypted data, but the risk is minimal (even less than for some wired networks).

As used herein, the term "embodiment" means an embodiment that serves to illustrate by way of example but not limitation.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention. It is therefore intended that the following appended claims include all such modifications, permutations and equivalents as fall within the true spirit and scope of the present invention.

What is claimed is:

1. A method comprising:
   receiving, from a wireless device, a first probe request on a first band and a second probe request on each of a plurality of other bands;
   determining that a received strength signal indicator (RSSI) on the first band is greater than a signal threshold, where the signal threshold is based on a highest RSSI value of one of the plurality of other bands;
   responding, based on the determining, to the first probe request on the first band; and
   refusing to respond, based on the determining, to each of the second probe requests on each of the plurality of other bands, where responding to the first probe request and refusing to respond to the second probe requests creates an impression, at the wireless device, that a service set identifier (SSID) is unavailable on each of the plurality of other bands.

2. The method of claim 1, further comprising:
   connecting the wireless device to a wireless network on the first band; and
   connecting the wireless device to a wireless network on the one of the plurality of other bands when the RSSI on the first band is below the signal threshold.

3. The method of claim 1, further comprising:
   connecting the wireless device to a wireless network on the first band after creating the impression at the wireless device that the SSID is unavailable on each of the plurality of other bands.

4. The method of claim 1, where refusing to respond to each of the second probe requests is further based on an amount of traffic on each of the plurality of other bands.

5. The method of claim 1, where refusing to respond to each of the second probe requests is further based on a load balance across the first band and each of the plurality of other bands.

6. The method of claim 1, further comprising:
   determining that the first band is a target band using available data, where the available data includes an access point occupancy associated with the first band and each of the plurality of other bands.

7. The method of claim 1, further comprising:
   selecting the first band as a target band, and
   where the responding to the first probe request is further based on the selecting the first band as the target band.

8. The method of claim 7, where the selecting the first band further comprises:
   receiving user input designating the first band as the target band.

9. A method comprising:
   setting an approximately 5 GHz spectrum band as a target band;
   determining that a particular client, of a plurality of clients, is compatible with the target band and that another client, of the plurality of clients, is not compatible with the target band;
   migrating, based on the determining, the particular client that is compatible with the target band from an approximately 2.4 GHz spectrum band to the target band when a first detected signal strength, associated with the particular client, exceeds a received strength signal indicator (RSSI) threshold; and
   switching the particular client back to the approximately 2.4 GHz spectrum band when a second detected signal strength, associated with the particular client, drops below the RSSI threshold.

10. The method of claim 9, further comprising:
    selecting another spectrum band as the target band;
    detecting a third signal strength associated with the particular client; and
    migrating, based on the detected third detected signal strength, the particular client from the approximately 2.4 GHz spectrum band to the other spectrum band.

11. The method of claim 9, further comprising:
    determining that a third client, of the plurality of clients, is compatible with the target band; and
    migrating, based on determining that the third client is compatible with the target band, the third client from another band to the target band.

12. The method of claim 9, further comprising:
    determining whether each of the plurality of clients are compatible with the target band; and
    migrating each of the plurality of clients that are determined to be compatible with the target band from the approximately 2.4 GHz spectrum band to the target band, where at least the other client, of the plurality of clients, is determined not to be compatible with the target band and remains connected to the 2.4 GHz spectrum band.

13. The method of claim 9, further comprising:
    disabling the migrating and the switching back based upon network traffic characteristics.

14. The method of claim 9, where the approximately 5 GHz spectrum band is an 802.11b/g band.

15. The method of claim 9, where the approximately 2.4 GHz spectrum band is an 802.11a band.

* * * * *

UNITED STATES PATENT AND TRADEMARK OFFICE
CERTIFICATE OF CORRECTION

PATENT NO.         : 8,064,939 B2                          Page 1 of 1
APPLICATION NO.    : 12/491201
DATED              : November 22, 2011
INVENTOR(S)        : Sudheer Poorna Chandra Matta It is certified that error appears in the above-identified patent and that said Letters Patent is hereby corrected as shown below:

In the Claims:
Claim 7, column 14, line 9 should read: "based on selecting the first band as the target band"

Signed and Sealed this
Third Day of January, 2012

David J. Kappos
*Director of the United States Patent and Trademark Office*